United States Patent
Fernández

(10) Patent No.: US 9,955,198 B2
(45) Date of Patent: *Apr. 24, 2018

(54) METHODS AND APPARATUS FOR TRANSMITTING MULTIMEDIA FILES AND ADVERTISEMENTS

(71) Applicant: Tamiras Per Pte. Ltd., LLC, Dover, DE (US)

(72) Inventor: Alvaro Fernández, Barcelona (ES)

(73) Assignee: TAMIRAS PER PTE. LTD., LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,966

(22) Filed: Mar. 29, 2016

(65) Prior Publication Data

US 2016/0212453 A1     Jul. 21, 2016

Related U.S. Application Data

(63) Continuation of application No. 14/185,261, filed on Feb. 20, 2014, now Pat. No. 9,324,097, which is a (Continued)

(30) Foreign Application Priority Data

Mar. 18, 2008   (ES) .................. 200800783

(51) Int. Cl.
*G06F 15/16*     (2006.01)
*H04N 21/2387*   (2011.01)
(Continued)

(52) U.S. Cl.
CPC ......... *H04N 21/2387* (2013.01); *G06Q 30/02* (2013.01); *G06Q 30/0241* (2013.01);
(Continued)

(58) Field of Classification Search
USPC ....... 709/217, 203, 206, 219, 223, 224, 226, 709/228, 231, 232, 238, 245; 725/14, 80,
(Continued)

(56) References Cited

U.S. PATENT DOCUMENTS

| 4,866,769 A | 9/1989 | Karp |
| 4,916,747 A | 4/1990 | Arimoto |

(Continued)

FOREIGN PATENT DOCUMENTS

| EP | 1243998 A1 | 9/2002 |
| EP | 1641263 A2 | 3/2006 |

(Continued)

OTHER PUBLICATIONS

"Iomega: Iomega and Reciprocal announce strategic relationship to advance secure distribution of portable content; Partnership enables consumres to transfer and bind secure downloaded content to portable Zip disks and other Iomega products," M2 Presswire; Jun. 27, 2001; 3 pages.

(Continued)

*Primary Examiner* — Quang N Nguyen
(74) *Attorney, Agent, or Firm* — Fitch, Even, Tabin & Flannery LLP

(57) ABSTRACT

The invention is directed to a method of transmitting a file having an advertising portion and a requested portion different from the advertising portion. The method includes receiving a request to transmit the file, via a streaming protocol allowing non-sequential access, transmitting the advertising portion of the file, receiving a request to transmit a portion of the requested portion of the file prior to completing transmitting the advertising portion of the file, completing the transmission of the advertising portion of the file, and transmitting the requested portion of the file.

13 Claims, 8 Drawing Sheets

Related U.S. Application Data continuation of application No. 13/592,237, filed on Aug. 22, 2012, now Pat. No. 8,676,885, which is a continuation of application No. 12/623,138, filed on Nov. 20, 2009, now Pat. No. 8,255,527, which is a continuation of application No. 12/431,553, filed on Apr. 28, 2009, now Pat. No. 8,185,625, which is a continuation of application No. 12/203,142, filed on Sep. 2, 2008, now Pat. No. 7,565,429, said application No. 12/623,138 is a continuation of application No. 12/431,563, filed on Apr. 28, 2009, now Pat. No. 8,028,064, which is a continuation of application No. 12/203,142, said application No. 12/623,138 is a continuation of application No. 12/431,737, filed on Apr. 28, 2009, now Pat. No. 7,962,548, which is a continuation of application No. 12/203,142, said application No. 12/623,138 is a continuation of application No. 12/431,738, filed on Apr. 28, 2009, now Pat. No. 8,055,781, which is a continuation of application No. 12/203,142, said application No. 12/623,138 is a continuation of application No. 12/431,743, filed on Apr. 28, 2009, now Pat. No. 7,809,790, which is a continuation of application No. 12/203,142.

(51) Int. Cl.

| | | |
|---|---|---|
| *G06Q 30/02* | (2012.01) | |
| *H04N 21/6437* | (2011.01) | |
| *H04N 21/658* | (2011.01) | |
| *H04N 21/6587* | (2011.01) | |
| *H04N 21/81* | (2011.01) | |
| *H04L 29/06* | (2006.01) | |
| *H04L 29/08* | (2006.01) | |

(52) U.S. Cl.
CPC ..... *G06Q 30/0272* (2013.01); *G06Q 30/0277* (2013.01); *H04L 65/4084* (2013.01); *H04L 65/602* (2013.01); *H04L 67/20* (2013.01); *H04N 21/6437* (2013.01); *H04N 21/6581* (2013.01); *H04N 21/6587* (2013.01); *H04N 21/812* (2013.01)

(58) Field of Classification Search
USPC .................................... 725/88; 386/240, 250
See application file for complete search history.

(56) References Cited

U.S. PATENT DOCUMENTS

| | | | |
|---|---|---|---|
| 4,953,209 | A | 8/1990 | Ryder, Sr. |
| 5,247,575 | A | 9/1993 | Sprague |
| 5,297,071 | A | 3/1994 | Sugino |
| 5,629,980 | A | 5/1997 | Stefik |
| 5,671,412 | A | 9/1997 | Christiano |
| 5,708,709 | A | 1/1998 | Rose |
| 5,790,664 | A | 8/1998 | Coley |
| 5,815,665 | A | 9/1998 | Teper |
| 5,855,008 | A | 12/1998 | Goldhaber |
| 5,864,620 | A | 1/1999 | Pettitt |
| 5,870,559 | A | 2/1999 | Leshem |
| 6,009,525 | A | 12/1999 | Horstmann |
| 6,073,124 | A | 6/2000 | Krishnan |
| 6,078,909 | A | 6/2000 | Knutson |
| 6,189,146 | B1 | 2/2001 | Misra |
| 6,226,618 | B1 | 5/2001 | Downs |
| 6,237,006 | B1 | 5/2001 | Weinberg |
| 6,247,130 | B1 | 6/2001 | Fritsch |
| 6,282,653 | B1 | 8/2001 | Berstis |
| 6,324,658 | B1 | 11/2001 | Jasperneite |
| 6,363,356 | B1 | 3/2002 | Horstmann |
| 6,389,403 | B1 | 5/2002 | Dorak, Jr. |
| 6,389,432 | B1 | 5/2002 | Pothapragada |
| 6,434,535 | B1 | 8/2002 | Kupka |
| 6,436,230 | B1 | 8/2002 | Kondo |
| 6,452,903 | B1 | 9/2002 | Peck |
| 6,484,182 | B1 | 11/2002 | Dunphy |
| 6,505,169 | B1 | 1/2003 | Bhagavath |
| 6,522,866 | B1 | 2/2003 | Merkle |
| 6,535,871 | B1 | 3/2003 | Romansky |
| 6,587,837 | B1 | 7/2003 | Spagna |
| 6,640,093 | B1 | 10/2003 | Wildhagen |
| 6,654,754 | B1 | 11/2003 | Knauft |
| 6,697,944 | B1 | 2/2004 | Jones |
| 6,704,733 | B2 | 3/2004 | Clark |
| 6,766,064 | B1 | 7/2004 | Langan |
| 6,772,340 | B1 | 8/2004 | Peinado |
| 6,775,655 | B1 | 8/2004 | Peinado |
| 6,871,220 | B1 | 3/2005 | Rajan |
| 6,947,981 | B2 | 9/2005 | Lubbers |
| 6,981,217 | B1 | 12/2005 | Knauft |
| 6,990,512 | B1 | 1/2006 | Major |
| 6,996,544 | B2 | 2/2006 | Sellars |
| 7,007,042 | B2 | 2/2006 | Lubbers |
| 7,024,393 | B1 | 4/2006 | Peinado |
| 7,036,011 | B2 | 4/2006 | Grimes |
| 7,051,005 | B1 | 5/2006 | Peinado |
| 7,054,443 | B1 | 5/2006 | Jakubowski |
| 7,065,507 | B2 | 6/2006 | Mohammed |
| 7,069,271 | B1 | 6/2006 | Fadel |
| 7,076,468 | B2 | 7/2006 | Hillegass |
| 7,103,351 | B2 | 9/2006 | Chaudhari |
| 7,103,574 | B1 | 9/2006 | Peinado |
| 7,103,645 | B2 | 9/2006 | Leighton |
| 7,110,982 | B2 | 9/2006 | Feldman |
| 7,120,250 | B2 | 10/2006 | Candelore |
| 7,120,429 | B2 | 10/2006 | Minear |
| 7,124,301 | B1 | 10/2006 | Uchida |
| 7,124,302 | B2 | 10/2006 | Ginter |
| 7,142,566 | B1 | 11/2006 | Leyn |
| 7,149,722 | B1 | 12/2006 | Abburi |
| 7,152,091 | B2 | 12/2006 | Kuriyama |
| 7,155,415 | B2 | 12/2006 | Russell |
| 7,171,662 | B1 | 1/2007 | Misra |
| 7,188,342 | B2 | 3/2007 | DeMello |
| 7,200,575 | B2 | 4/2007 | Hans |
| 7,203,758 | B2 | 4/2007 | Cook |
| 7,222,078 | B2 | 5/2007 | Abelow |
| 7,249,060 | B2 | 7/2007 | Ling |
| 7,277,870 | B2 | 10/2007 | Mourad |
| 7,292,773 | B2 | 11/2007 | Angel |
| 7,356,557 | B2 | 4/2008 | Kikuchi |
| 7,373,391 | B2 | 5/2008 | Iinuma |
| 7,395,244 | B1 | 7/2008 | Kingsford |
| 7,516,493 | B2 | 4/2009 | Matsuyama |
| 7,523,071 | B2 | 4/2009 | Fox |
| 7,565,429 | B1 | 7/2009 | Fernandez |
| 7,574,486 | B1 | 8/2009 | Cheng |
| 7,593,902 | B2 | 9/2009 | Murase |
| 7,603,409 | B2 | 10/2009 | Kobayashi |
| 7,636,792 | B1 | 12/2009 | Ho |
| 7,640,333 | B1 | 12/2009 | Fernandez Gutierrez |
| 7,653,198 | B2 | 1/2010 | Sake |
| 7,707,115 | B2 | 4/2010 | Goringe |
| 7,743,161 | B2 | 6/2010 | Dey |
| 7,747,466 | B2 | 6/2010 | Fernandez |
| 7,809,790 | B2 | 10/2010 | Fernandez |
| 7,856,645 | B2 | 12/2010 | Pharn |
| 7,860,963 | B2 | 12/2010 | Matsuoka |
| 7,882,037 | B2 | 2/2011 | Hirsch |
| 7,908,354 | B2 | 3/2011 | Fernandez Gutierrez |
| 7,921,198 | B2 | 4/2011 | Fernarndez Gutierrez |
| 7,962,548 | B2 | 6/2011 | Fernandez |
| 7,966,411 | B2 | 6/2011 | Fernandez |
| 7,984,097 | B2 | 7/2011 | Fernandez |
| 7,984,174 | B2 | 7/2011 | Rideout |
| 8,028,064 | B2 | 9/2011 | Fernandez |
| 8,055,781 | B2 | 11/2011 | Fernandez |
| 8,064,449 | B2 | 11/2011 | Fernandez Gutierrez |
| 8,086,716 | B2 | 12/2011 | Gutierrez |
| 8,090,774 | B2 | 1/2012 | Fernandez |

(56) References Cited

U.S. PATENT DOCUMENTS

| | | |
|---|---|---|
| 8,094,602 B2 | 1/2012 | Gutierrez |
| 8,185,625 B2 | 5/2012 | Fernandez |
| 8,185,626 B2 | 5/2012 | Fernandez |
| 8,422,499 B2 | 4/2013 | Fernandez Gutierrez |
| 8,769,149 B2 | 7/2014 | Sidi |
| 8,868,464 B2 | 10/2014 | Zhuk |
| 2001/0014876 A1 | 8/2001 | Miyashita |
| 2001/0044851 A1 | 11/2001 | Rothman |
| 2002/0053078 A1* | 5/2002 | Holtz ............... G06Q 30/06 725/14 |
| 2002/0073084 A1 | 6/2002 | Kauffman |
| 2002/0091570 A1 | 7/2002 | Sakagawa |
| 2002/0091584 A1 | 7/2002 | Clark |
| 2002/0097728 A1 | 7/2002 | Hinderks |
| 2002/0107809 A1 | 8/2002 | Biddle |
| 2002/0116517 A1 | 8/2002 | Hudson |
| 2002/0133518 A1 | 9/2002 | Landsman |
| 2002/0138441 A1 | 9/2002 | Lopatic |
| 2002/0169833 A1 | 11/2002 | Tani |
| 2002/0188523 A1 | 12/2002 | Hyyppa |
| 2003/0007646 A1 | 1/2003 | Hurst |
| 2003/0046367 A1 | 3/2003 | Tanaka |
| 2003/0050887 A1 | 3/2003 | Geiger |
| 2003/0120557 A1 | 6/2003 | Evans |
| 2003/0149975 A1 | 8/2003 | Eldering |
| 2003/0185399 A1 | 10/2003 | Ishiguro |
| 2003/0188317 A1 | 10/2003 | Liew |
| 2003/0223094 A1 | 12/2003 | Naito |
| 2003/0236756 A1 | 12/2003 | Humpleman |
| 2004/0003398 A1 | 1/2004 | Donian |
| 2004/0059708 A1 | 3/2004 | Dean |
| 2004/0088349 A1 | 5/2004 | Beck |
| 2004/0093327 A1 | 5/2004 | Anderson |
| 2004/0098344 A1 | 5/2004 | Nakanishi |
| 2004/0139204 A1 | 7/2004 | Ergezinger |
| 2004/0143667 A1 | 7/2004 | Jerome |
| 2004/0148229 A1 | 7/2004 | Maxwell |
| 2004/0148424 A1 | 7/2004 | Berkson |
| 2004/0205114 A1 | 10/2004 | Kinoshita |
| 2004/0255135 A1 | 12/2004 | Kitaya |
| 2005/0004873 A1 | 1/2005 | Pou |
| 2005/0021467 A1 | 1/2005 | Franzdonk |
| 2005/0034171 A1 | 2/2005 | Benya |
| 2005/0076104 A1 | 4/2005 | Liskov |
| 2005/0091166 A1 | 4/2005 | Seamans |
| 2005/0114205 A1 | 5/2005 | Nelson |
| 2005/0144136 A1 | 6/2005 | Murashita |
| 2005/0146966 A1 | 7/2005 | Kawamura |
| 2005/0251489 A1 | 11/2005 | Coley |
| 2005/0288999 A1 | 12/2005 | Lerner |
| 2006/0013557 A1 | 1/2006 | Poslinski |
| 2006/0031175 A1 | 2/2006 | Sellars |
| 2006/0031892 A1* | 2/2006 | Cohen ............... H04N 7/17318 725/88 |
| 2006/0059223 A1 | 3/2006 | Klemets |
| 2006/0089912 A1 | 4/2006 | Spagna |
| 2006/0095792 A1 | 5/2006 | Hurtado |
| 2006/0136967 A1 | 6/2006 | Hellman |
| 2006/0143135 A1 | 6/2006 | Tucker |
| 2006/0167812 A1 | 7/2006 | Bhambri |
| 2006/0218602 A1 | 9/2006 | Sherer |
| 2006/0251387 A1 | 11/2006 | Tanikawa |
| 2006/0277098 A1 | 12/2006 | Chung |
| 2007/0005804 A1 | 1/2007 | Rideout |
| 2007/0038567 A1 | 2/2007 | Allaire |
| 2007/0067495 A1 | 3/2007 | Levy |
| 2007/0083886 A1 | 4/2007 | Kauffman |
| 2007/0094691 A1 | 4/2007 | Gazdzinski |
| 2007/0118849 A1 | 5/2007 | Kisel |
| 2007/0140318 A1 | 6/2007 | Hellman |
| 2007/0155204 A1 | 7/2007 | Klitsner |
| 2007/0162560 A1 | 7/2007 | Jin |
| 2007/0168294 A1 | 7/2007 | Tsurukawa |
| 2007/0220430 A1 | 9/2007 | Sato |
| 2007/0244823 A1 | 10/2007 | Motley |
| 2007/0282714 A1 | 12/2007 | Aydar |
| 2007/0294772 A1 | 12/2007 | Hydrie |
| 2008/0019516 A1 | 1/2008 | Fransdonk |
| 2008/0022347 A1 | 1/2008 | Cohen |
| 2008/0027750 A1 | 1/2008 | Barkeloo |
| 2008/0069099 A1 | 3/2008 | Tani |
| 2008/0077478 A1 | 3/2008 | Kim |
| 2008/0086570 A1 | 4/2008 | Dey |
| 2008/0092168 A1 | 4/2008 | Logan |
| 2008/0092182 A1 | 4/2008 | Conant |
| 2008/0114695 A1 | 5/2008 | Gutierrez |
| 2008/0141307 A1 | 6/2008 | Whitehead |
| 2008/0152300 A1* | 6/2008 | Knee ............... G11B 27/005 386/250 |
| 2008/0152316 A1* | 6/2008 | Sylvain ............... G11B 27/034 386/240 |
| 2008/0172300 A1 | 7/2008 | Karki |
| 2008/0177630 A1 | 7/2008 | Maghfourian |
| 2008/0189429 A1 | 8/2008 | DaCosta |
| 2008/0195761 A1 | 8/2008 | Jabri |
| 2008/0242280 A1 | 10/2008 | Shapiro |
| 2008/0249872 A1 | 10/2008 | Russell |
| 2008/0250029 A1 | 10/2008 | Fernandez |
| 2008/0255943 A1 | 10/2008 | Morten |
| 2008/0288976 A1 | 11/2008 | Carson |
| 2008/0320605 A1 | 12/2008 | Ben-Yaacov |
| 2009/0083144 A1 | 3/2009 | Menditto |
| 2009/0165041 A1 | 6/2009 | Penberthy |
| 2009/0204541 A1 | 8/2009 | Zhuk |
| 2009/0205031 A1 | 8/2009 | Sato |
| 2009/0210899 A1 | 8/2009 | Lawrence-Apfelbaum |
| 2009/0222530 A1* | 9/2009 | Buford ............... H04L 12/185 709/217 |
| 2009/0259764 A1 | 10/2009 | Karlsson |
| 2009/0286560 A1 | 11/2009 | Willis |
| 2010/0031162 A1 | 2/2010 | Wiser |
| 2010/0046516 A1 | 2/2010 | Fernandez |
| 2010/0064054 A1 | 3/2010 | Karlsson |
| 2010/0076827 A1 | 3/2010 | Fernandez |
| 2010/0153231 A1 | 6/2010 | Fernandez Gutierrez |
| 2010/0153873 A1 | 6/2010 | Gutierrez |
| 2010/0172351 A1 | 7/2010 | Gutierrez |
| 2010/0172352 A1 | 7/2010 | Gutierrez |
| 2010/0172353 A1 | 7/2010 | Gutierrez |
| 2010/0228647 A1 | 9/2010 | Fernandez Gutierrez |
| 2010/0235237 A1 | 9/2010 | Fernandez |
| 2010/0235262 A1 | 9/2010 | Gutierrez |
| 2010/0235263 A1 | 9/2010 | Fernandez Gutierrez |
| 2010/0235264 A1 | 9/2010 | Fernandez Gutierrez |
| 2010/0235265 A1 | 9/2010 | Fernandez Gutierrez |
| 2010/0250400 A1 | 9/2010 | Fernandez Gutierrez |
| 2010/0257051 A1 | 10/2010 | Fernandez Gutierrez |
| 2010/0274664 A1 | 10/2010 | Fernandez Gutierrez |
| 2011/0016498 A1* | 1/2011 | Tsuria ............... H04N 21/25808 725/80 |
| 2011/0060688 A1 | 3/2011 | Fernandez Gutierrez |
| 2011/0060689 A1 | 3/2011 | Fernandez Gutierrez |
| 2011/0078044 A1 | 3/2011 | Fernandez Gutierrez |
| 2011/0137738 A1 | 6/2011 | Fernandez |
| 2011/0137754 A1 | 6/2011 | Fernandez |
| 2012/0323651 A1 | 12/2012 | Fernandez |

FOREIGN PATENT DOCUMENTS

| | | |
|---|---|---|
| JP | 2002175436 | 6/2002 |
| JP | 2003186905 | 7/2003 |
| JP | 2003256670 | 9/2003 |
| JP | 2003288130 | 10/2003 |
| KR | 20030075948 | 9/2003 |
| WO | 2006086717 A1 | 8/2006 |
| WO | 2006138432 A2 | 12/2006 |
| WO | 2008055562 A1 | 5/2008 |
| WO | 2008122308 A1 | 10/2008 |
| WO | 2009000306 A1 | 12/2008 |
| WO | 2009049659 A1 | 4/2009 |
| WO | 2009056175 A1 | 5/2009 |
| WO | 2009065526 A1 | 5/2009 |
| WO | 2009095041 A1 | 8/2009 |

(56) References Cited

FOREIGN PATENT DOCUMENTS

| WO | 2009109684 A1 | 9/2009 |
| WO | 2009115631 A1 | 9/2009 |
| WO | 2010125052 A2 | 11/2010 |

OTHER PUBLICATIONS

Arnab, Alapan et al., "Verifiable Digital Object Identity System," published in DRM '06, Oct. 30, 2006, by the Association for Computing Machinery (ACM), in Alexandria, VA, USA; 7 pages.

Delgado, Jaime et al.; "Standardisation of the management of Intellectual Property Rights in multimedia content," IEEE Proceedings of the Second International Conference on WEB Delivering of Music; Jan. 2002; 8 pages.

Duncan, Geoff; "Philips Wants to Patent Must-See Ads," Digital Trends; Apr. 19, 2006; from http://www.digitaltrends.com/home-theater/philips-wants-to-patent-must-see-ads/; 4 pages.

Gil, Rosa et al.; "Managing Intellectual Property Rights in the WWW: Patterns and Semantics," IEEE Proceedings of the First International Conference on Automated Production of Cross Media Content for Multi-Channel Distribution, 2005; 8 pages.

Hwang, Seong Oun et al.; "Modeling and implementation of digital rights," The Journal of Systems and Software 73 (2004) 533-549; 17 pages.

International Preliminary Report on Patentability and the Written Opinion of the International Searching Authority for International Application No. PCT/ES2008/009616, dated May 25, 2010; 7 pages.

International Preliminary Report on Patentability for International Application No. PCT/ES2009/070064, dated Jul. 14, 2009 (Spanish version); 13 pages.

International Search Report and the Written Opinion of the International Searching Authority for International Application No. PCT/EP2007/005049 dated Dec. 17, 2007; 13 pages.

International Search Report and the Written Opinion of the International Searching Authority for International Application No. PCT/EP2010/055608; dated Nov. 4, 2010; 16 pages.

International Search Report for International Application No. PCT/EP2007/008195 dated Dec. 28, 2007; 3 pages.

Jung, Sun-Mi et al.; "Implementation of the Agent Based Digital Rights Management System for Interaction on the Web," Abstract; published in Proceedings of the IASTED International Conference Internet and Multimedia Systems; conference article from conference held Aug. 13-16, 2008 in Honolulu, HI, USA; 1 page.

Liu, Qiong et al.; "Digital Rights Management from Content Distribution," Australian Information Security Workshop 2003 (AISW2003); Adelaide, Australia 2003; 10 pages.

Paskin, N.; "The digital object identifier system: digital technology meets content management," Abstract; from Interlending and Document Supply, 1999, vol. 27, Issue 1, pp. 13-16; 1 page.

Radding, Alan; "Update reqs challenge software distribution tools," Software Magazine [Online], Sep. 1993; vol. 13, No. 14 (Special), pp. 31-41.

Spanish Patent and Trademark Office, International Preliminary Report on Patentability for International Application No. PCT/ES2009/070064, dated Oct. 14, 2010. (English Translation); 9 pages.

Spanish Patent and Trademark Office, International Preliminary Report on Patentability for International Application No. PCT/ES2009/070064, dated Sep. 21, 2010. (Spanish Version); 6 pages.

Williams, Louise Moore; "E-warehouse is secure ESD (electronic software distribution)," Tape-Disc Business [Online], Aug. 1997, vol. 11, No. 8, p. 31(5).

International Preliminary Report on Patentability dated Oct. 14, 2010 for PCT/ES2009/070064; International Buereau of WIPO.

* cited by examiner

METHODS AND APPARATUS FOR TRANSMITTING MULTIMEDIA FILES AND ADVERTISEMENTS

CROSS-REFERENCE TO RELATED APPLICATIONS

The present application is a continuation application of patent application Ser. No. 14/185,261, filed on Feb. 20, 2014, now issued on Apr. 26, 2016 as U.S. Pat. No. 9,324,097 which is a continuation of Ser. No. 13/592,237, filed Aug. 22, 2012, now issued as U.S. Pat. No. 8,676,885 on Mar. 18, 2014, which is a continuation of patent application Ser. No. 12/623,138, filed on Nov. 20, 2009, now issued as U.S. Pat. No. 8,255,527 on Aug. 28, 2012, which is a continuation application of patent application Ser. No. 12/431,553, filed on Apr. 28, 2009, now issued as U.S. Pat. No. 8,185,625 on May 22, 2012, which is a continuation application of patent application Ser. No. 12/203,142, filed on Sep. 2, 2008, now issued as U.S. Pat. No. 7,565,429 on Jul. 21, 2009, which claims priority to Spanish Patent Application No. 200800783, filed on Mar. 18, 2008, which is entitled "METHOD USED BY A STREAMING SERVER FOR TRANSMITTING A MULTIMEDIA FILE ON A DATA NETWORK," all of which are incorporated herein by reference: the patent application Ser. No. 12/623,138, also is a continuation application of patent application Ser. No. 12/431,563, filed on Apr. 28, 2009, which issued as U.S. Pat. No. 8,028,064 on Sep. 27, 2011, as well as patent application Ser. No. 12/431,737, which issued as U.S. Pat. No. 7,962,548 on Jun. 14, 2011, as well as patent application Ser. No. 12/431,738, which issued as U.S. Pat. No. 8,055,781 on Nov. 8, 2011, as well as patent application Ser. No. 12/431,743, which issued as U.S. Pat. No. 7,809,790 on Oct. 5, 2010, all filed on Apr. 28, 2009, and all of which are continuation applications of patent application Ser. No. 12/203,142, filed Sep. 2, 2008, which claims priority to Spanish Patent Application No. 200800783, filed on Mar. 18, 2008, all of which are incorporated herein by reference. The present application also relates to patent application Ser. No. 12/623,215, filed Nov. 20, 2009, which issued as U.S. Pat. No. 8,185,626 on May 22, 2012, patent application Ser. No. 12/623,189, filed Nov. 20, 2009, which issued as U.S. Pat. No. 7,966,411 on Jun. 21, 2011, patent application Ser. No. 12/702,168, filed Feb. 8, 2010, which issued as U.S. Pat. No. 7,984,097 on Jul. 19, 2011, patent application Ser. No. 13/157,175, filed Jun. 9, 2011, which issued as U.S. Pat. No. 8,090,774 on Jan. 3, 2012, and patent application Ser. No. 13/250,041, filed Sep. 30, 2011, which issued as U.S. Pat. No. 9,270,764 on Feb. 23, 2016, and patent application Ser. No. 14/993,869, filed Jan. 12, 2016, all of which are herein incorporated by reference.

BACKGROUND OF THE INVENTION

1. Field of the Invention

The invention relates generally to methods for distributing digital files over a data network, in which the digital files contain an advertisement portion and a non-advertisement portion positioned after the advertisement portion, and the digital file may be not be viewed non-sequentially.

2. Description of the Related Art

Known systems and methods for playing audiovisual content protected by intellectual property rights, such as movies or music, employ Digital Rights Management (DRM) technologies in which users pay to view the audio-visual content which they wish to view without also receiving advertising content.

Content producers and distributors who use this pay for content principle have been damaged by the creation of the Peer-to-Peer ("P2P") networks which allow users to exchange files free of charge. There currently are several P2P networks, such as eMule, Ares Galaxy, and Bittorrent, which are widespread. The P2P transmissions are systems that take advantage of the upload bandwidth which every user has in order to allow users to share files. As a result of this upload bandwidth, every user who receives data from a file may send the data to other users. In this way, a network of users is created who may exchange among themselves the data that comprise the file, instead of each user downloading the file in its entirety from a provider site.

The owners of the intellectual property rights of the files that are distributed on P2P networks have taken numerous legal actions in different countries with the intent of trying to close down the P2P networks. Nevertheless, in many countries, the current legal situation of the P2P networks is not very clear and varies from country to country. Moreover, "pure" P2P networks have appeared in which there are no servers that may be closed down. These new networks use new technologies, such as Distributed Hash Tables (DHT) that allow the networks to operate without any server. Thus, there is no single central point for closing down the operation of the network. To close down a pure P2P network, a substantial portion of its nodes must be frozen, which makes it difficult to effectively close down these networks.

Despite increasing popularity of P2P networks and increasing complexity of DRM technologies, there has not been a significant effect on conventional television that applies advertising systems Another known system and method for playing videos uses streaming technology, which allows a user to begin to view the content while downloading it, without needing to wait for the file to be completely downloaded. These known systems may use a streaming protocol, e.g., the Real Time Streaming Protocol ("RTSP"), which is described in the RFC 2326 specifications published by the IETF (Request for Comments 2326, April 1998; currently available at the Internet address http://www.ietf.org/rfc/rfc2326.txt), the entirety of which is herein incorporated by reference. The operation of the RTSP protocol may be closely related to two other IETF (Internet Engineering Task Force) protocols, the SDP and RTP protocols.

The Session Description Protocol (SDP) is described in the RFC 4566 specifications published online by the IETF. (M. Handley et al., Request For Comments 4566, Network Working Group, July 2006, currently available at the Internet address http://www.ietf.org/rfc/rfc4566.txt), the entirety of which is herein incorporated by reference. The Real-Time Transport Protocol (RTP) is described in the RFC 3550 specifications published online by the IETF. (H. Schultzrinne et al., Request For Comments 3550, Network Working Group, July 2003, currently available at the Internet address http://www.ietf.org/rfc/rfc3550.txt), the entirety of which is herein incorporated by reference.

A newer draft of the RTSP protocol, designated as RTSP 2.0, is described in the document published online by the IETF "Real Time Streaming Protocol 2.0 (RTSP) draft-ietf-mmusic-rfc2326bis-16.txt", H. Schulzrinne et al., MMUSIC Working Group, Nov. 19, 2007, currently available at the Internet address http://www.ietf.org/internet-drafts/draft-ietf-mmusic-rfc2326bis-16.txt), the entirety of which is herein incorporated by reference.

Another protocol related to the RTSP is the HTTP protocol (Hypertext Transfer Protocol) described in the RFC 2616 specifications published online by the IETF (R. Fielding et al., Request For Comments 2616, Network Working Group, June 1999, currently available at the Internet address http://www.w3.org/Protocols/rfc2616/rfc2616.html), the entirety of which is herein incorporated by reference.

The RTSP is a client-server protocol based on text messages designed to facilitate communication between a client and a streaming server, such that the client controls the streaming transmission from the server using the RTSP protocol as though it were a remote control of the server. The client may be any equipment configured to play a multimedia stream, such as a computer, a PDA, a mobile phone and in general any equipment that incorporates an audio or video player.

RTSP allows one or more flows of data, e.g., "streams," to be established from the streaming server to the multimedia player. The RTSP protocol is the protocol that the multimedia player uses to communicate to the streaming server the content it wishes to receive by RTSP messages. The streaming server also sends RTSP messages to the multimedia player with information about the selected content and the way in which it is going to transmit it to the multimedia player.

The RTSP protocol uses the term "presentation" to refer to a set of streams that are presented together to the customer and that are defined in a presentation file called "Presentation Description" or "Presentation Description File." Other protocols use different names to refer to a presentation. For example, the SDP protocol uses the term "session" to refer to a presentation.

The presentation file contains information about each stream that includes, for example, information on whether it is an audio or video stream, the type of coding used, Internet addresses needed to access each stream, or the like.

The presentation file may use various formats to describe this information. The SDP protocol is usually the most used, although it is not necessary to use the SDP protocol, and the RTSP protocol may describe the information using protocols other than the SDP. A file of a presentation is normally identified by a URI ("Uniform Resource Identifier"). For example, the next URI could be used to identify the file of a presentation:

rtsp://media.example.com:554/twister/audiotrack

The client may access the file of a presentation using the RTSP protocol or other protocols, such as the HTTP (Hypertext Transfer Protocol) protocol. The client may also receive the file that describes the presentation by electronic mail or by any other means.

RTSP uses the term "container file" to refer to a multimedia file that contains the data of one or more streams and which normally form a presentation when they are played together. For example, a container file may contain three streams: a first video stream of a movie, a second stream for the audio of the movie in English and a third stream with the audio in Spanish.

RTSP uses the term "RTSP session" to define an abstraction (for example a software module being run on the streaming server) that uses the streaming server to control each presentation it sends to each user. Each RTSP session is created, maintained and eliminated by the server. Normally a client requests to create a session by sending the SETUP command from the RTSP protocol to the server and receives an RTSP response from the server, called RESPONSE message with an identifier of the session created.

The RTSP sessions maintain information on the status of each presentation requested by each user. This is an important difference with respect to the HTTP protocol, which is a protocol that does not maintain the status of the client's requests.

Another important difference is that in the RTSP protocol, the server may send RTSP messages with commands to the client as well as receive them. The following table 1 taken from the RFC 2326 indicates the different commands, messages or methods in RTSP terminology, which may be sent between the client and the server. The RTSP server may send packets of data from each stream to the client using the RTP protocol, but RTSP does not depend on the RTP protocol and could use other carrier protocols.

TABLE 1

| method | direction | object | requirement |
|---|---|---|---|
| DESCRIBE | C -> S | P, S | recommended |
| ANNOUNCE | C -> S, S -> C | P, S | optional |
| GET_PARAMETER | C -> S, S -> C | P, S | optional |
| OPTIONS | C -> S, S -> C | P, S | required (S -> C: optional) |
| PAUSE | C -> S | P, S | recommended |
| PLAY | C -> S | P, S | required |
| RECORD | C -> S | P, S | optional |
| REDIRECT | S -> C | P, S | optional |
| SETUP | C -> S | S | required |
| SET_PARAMETER | C -> S, S -> C | P, S | optional |
| TEARDOWN | C -> S | P, S | required |

In these known systems which use streaming protocols, a distributor may transmit a digital file to a user, and the user may view the digital file. The digital file may comprise a first portion which comprises advertising content, and a second portion which contains content which the user requested to view. The advertising content is presented to the user before the user requested content is presented to the user. Nevertheless, the streaming protocols allow the user to non-sequentially view the content of the digital file, such that the user is able to skip the advertisement, or fast forward through the advertising content, to reach the user requested content. Consequently, these known systems may not be effective with respect to achieving the goal of having the user view the advertising content.

SUMMARY OF THE INVENTION

Therefore, a need has arisen for methods for providing an improved system for transmitting content, including advertising, over a data network, such as the Internet.

An embodiment of the invention comprises a method of transmitting a digital file comprising an advertising portion comprising a first type of content and a requested portion comprising a second type of content which is different than the first type of content, the method comprising the steps of receiving, via a streaming protocol, a request to transmit the digital file, wherein the streaming protocol is configured to allow non-sequential access to the digital file, transmitting the advertising portion of the digital file in response to the request to transmit the digital file, receiving, via the streaming protocol, a request to transmit at least one portion of the requested portion of the digital file after beginning transmission of the advertising portion and prior to completion of the transmission of the advertising portion of the digital file, transmitting a signal comprising an indication that the signal will be followed by the at least one portion of the requested portion prior to completing the transmission of the advertising portion, completing the transmission of the advertising portion of the digital file after receiving the request to transmit the requested portion of the digital file, and, after completing the transmission of the advertising portion, transmitting the at least one portion of the requested portion of the digital file.

Another embodiment of the invention comprises a method of transmitting digital data comprising an advertising portion comprising a first type of content and a requested portion comprising a second type of content which is different than the first type of content, the method comprising the steps of receiving a first request to transmit the digital data, generating a first digital file comprising the digital data and supplemental digital data, transmitting the advertising portion of the digital data in response to the first request, receiving a second request to transmit at least one portion of the requested portion of the digital data after beginning transmission of the advertising portion of the digital data and prior to completion of the transmission of the advertising portion of the digital data, such that a first portion of the advertising portion is transmitted prior to receiving the second request, and a second portion of the advertising portion is untransmitted prior to receiving the second request, generating a second digital file by positioning a portion of the supplemental digital data between the first portion of the advertising portion and the second portion of the advertising portion, completing the transmission of the advertising portion of the digital data after receiving the second request, and, after completing the transmission of the advertising portion of the digital data, transmitting the at least one portion of the requested portion of the digital data.

Still another embodiment of the invention comprises a method of transmitting digital data comprising an advertising portion comprising a first type of content and a requested portion comprising a second type of content which is different than the first type of content, the method comprising the steps of receiving a first request to transmit the digital data, generating a particular digital file comprising the digital data and supplemental digital data, transmitting the advertising portion of the digital data in response to the first request, receiving a second request to transmit at least one portion of the requested portion of the digital data after beginning transmission of the advertising portion of the digital data and prior to completion of the transmission of the advertising portion of the digital data, and terminating the transmission of the advertising portion of the digital data.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

DETAILED DESCRIPTION OF EMBODIMENTS OF THE INVENTION

Embodiments of the present invention and their advantages may be understood by referring to FIGS. 1-8, like numerals being used for like corresponding parts in the various drawings.

Figure 1:
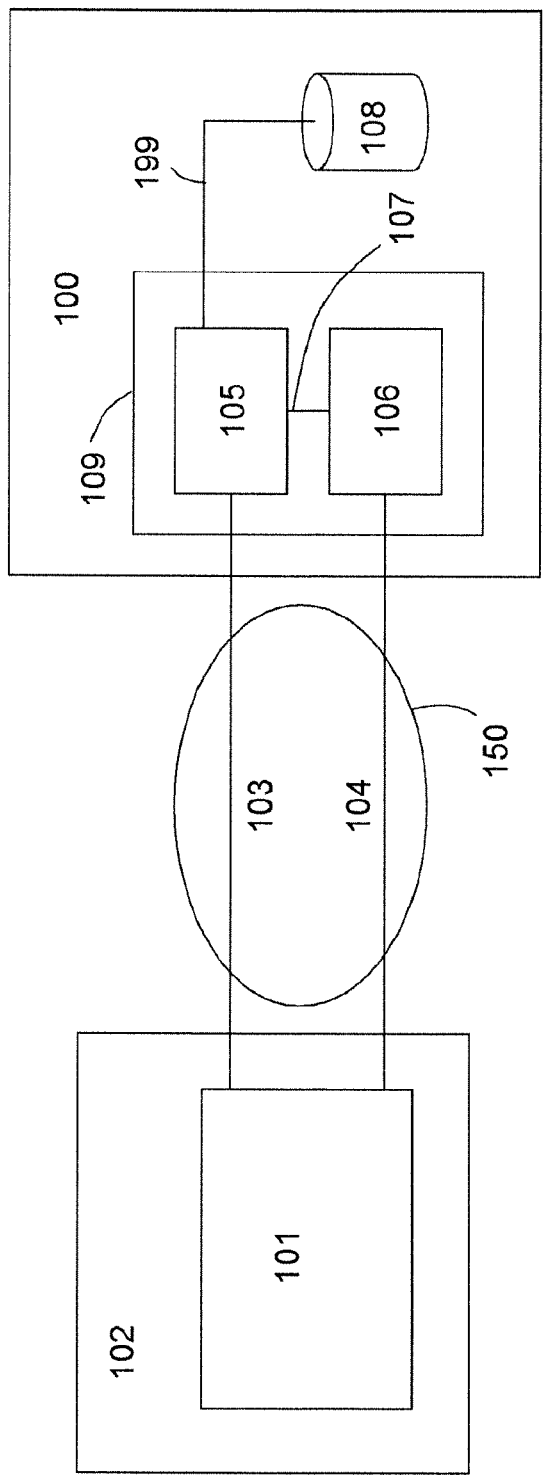
FIG. 1 is a block diagram illustrating a system for carrying out distribution of files from a streaming server to communication equipment, e.g., a multimedia player, according to an embodiment of the invention.

As shown in FIG. 1, a device 102, e.g., a personal computer, a PDA, a mobile phone, or any other device configured to play or display any type of media, may comprise a media player, e.g., multimedia player 101. Device 102 may communicate with a server, e.g., a streaming server 100. Streaming server 100 may be a streaming server that uses the RTSP and RTP protocols. Device 102 may be a personal computer, a PDA, a mobile phone or any other device that may comprise a multimedia player 101.

Streaming server 100 may comprise an RTSP module 105 and an RTP module 106, which may be used in an application 109. Application 109 may perform streaming functions in server 100. RTSP module 105 and RTP module 106 may control RTSP and RTP communications, respectively, with the multimedia player 101. RSTP module 105 and RTP module 106 may operate in a coordinated manner in the streaming server, and may communicate between themselves via a communication path, e.g., line 107.

The streaming server 100 also may comprise a database or storage means 108 which may store files, e.g., multimedia files, audio files, video files, and the like. The streaming server 100 may combine various multimedia files in order to generate new multimedia files. Specifically, streaming server 100 may combine advertising files with content files in order to generate a multimedia file that contains advertising and content. A user of multimedia player 101 may request a specific file or a file of a specific content, which streaming server 100 may retrieve from storage means 108.

As shown in FIG. 1, RTSP communication between multimedia player 101 and RTSP module 105 of streaming server 100 may be carried out via a communication path, e.g., line 103. This communication may comprise the multimedia player 101 and the streaming server 100 exchanging messages in the RTSP protocol.

RTP communication may be carried out via a communication path, e.g., line 104 and may be used, such that the streaming server 100 sends RTP packets to the multimedia player 101 and also, such that the streaming server 100 and the multimedia player 101 may exchange some control packets using a Real-Time Control Protocol, ("RTCP"), which may be a part of the RTP protocol. Communications represented by lines 103 and 104 may be a portion of a data network 150, e.g., the Internet, a Local Area Network ("LAN"), a Wide Area Network ("WAN"), or the like.

FIG. 1 displays RTSP and RTP communications as two lines. One line may represent RTSP communications and another line may represent RTP and RTCP communications. Nevertheless, in an embodiment of the invention, both communications also may function by sharing the same TCP/IP connection. In another embodiment of the invention, the RTP protocol may uses two different TCP/IP connections, e.g., a first connection for the RTP packets and a second connection for the RTCP packets.

Figure 2:
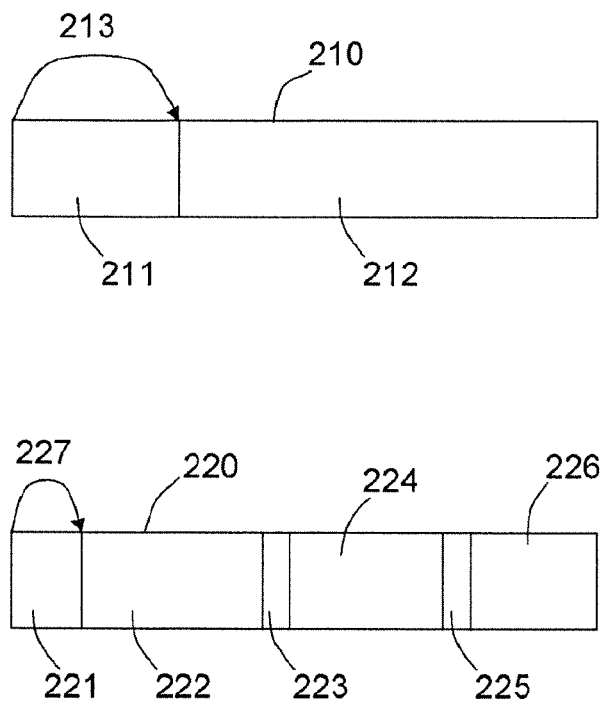
FIG. 2 is a block diagram illustrating multimedia files having portions containing content and portions containing advertising, according to an embodiment of the invention.

Referring now to FIG. 2, a multimedia file 210 may comprise one or more streams, e.g., audio streams, video streams, streams containing movies and songs or portions of movies and songs, and the like. Multimedia file 210 may comprise a first portion, e.g., advertising portion 211, and a second portion, e.g., content portion 212. The protocol may be designed, such that a user may send an instruction for multimedia player 101 to skip advertising portion 211, represented in FIG. 2 by line 213. Multimedia file 220 may comprise a plurality of, e.g., three, advertising portions, e.g., advertising portions 221, 223 and 225, and a plurality of, e.g., three, content portions, e.g., content portions 222, 224 and 226. Although FIG. 2 illustrates three advertising portions and three content portions, multimedia files which contain different numbers of advertising portions and content portions may be used. In FIG. 2, a user of a multimedia player 101 may send an instruction for multimedia player 101 to skip the advertising as shown by line 227.

Figure 3:
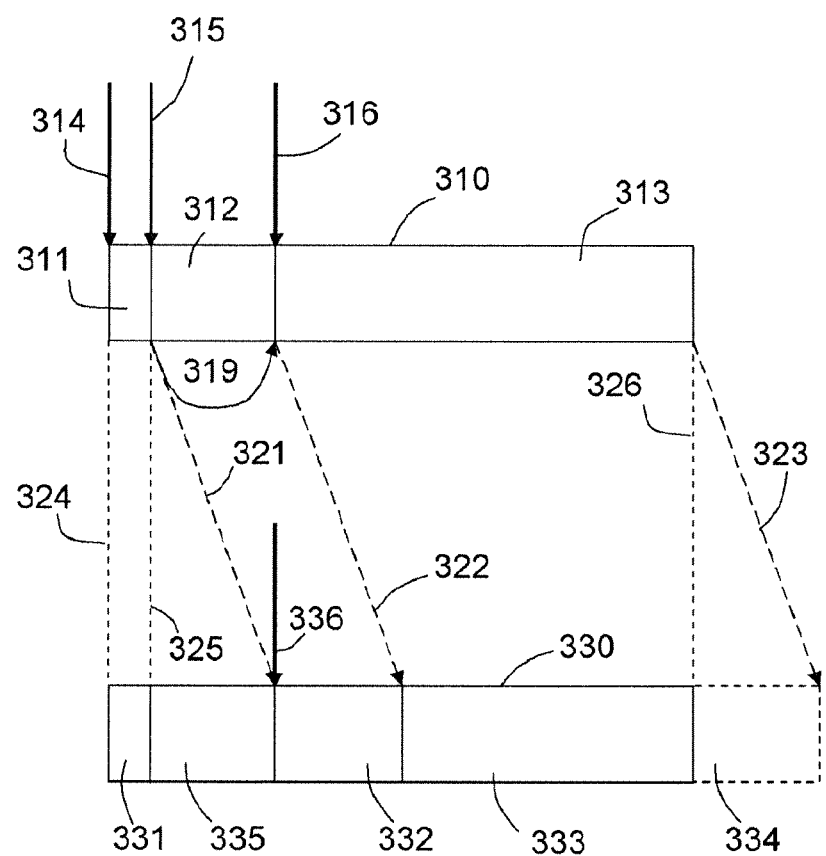
FIG. 3 is a diagram containing a multimedia file and a virtual file, and illustrating the process of transmitting the multimedia file when there is a request to retrieve non-sequential content from the file, according to a known process.

FIG. 3 illustrates an operation that prevents the multimedia player 101 from skipping the advertising of a transmission of a multimedia file 310 transmitted by streaming server 100, according to an embodiment of the invention. In order to simplify the explanation, FIG. 3 shows a file 310 that contains advertising portions 311 and 312 before a single content portion 313. Nevertheless, fewer or more advertising portions, or content portions, or both, may be present. File 310 may be a multimedia file or "container file" stored in the database 108 of the streaming server 100. Multimedia file 310 may contain various audio and video streams that may not be shown, in order to simplify the figure. Multimedia file 310 may have an order of transmission, such that advertising portions 311 and 312 may be transmitted prior to transmission of content portion 313.

Streaming server 100 may receive, by the RTSP protocol, a message, e.g., a SETUP message, which may cause streaming server 100 to prepare a multimedia transmission. Upon receiving the message, streaming server 100 may create an RTSP session and may send a message, e.g., a RESPONSE message, to multimedia player 101. The RESPONSE message may comprise the information needed for multimedia player 101 to send RTSP message using the RSTP session created by streaming server 100. Streaming server 100 then may receive a message, e.g., a first PLAY message, to initiate the transmission of the content of file 310 from its beginning. This transmission may be indicated in FIG. 3 by arrow 314.

Upon receiving the first PLAY message in the RTSP protocol, streaming server 100 may initiate a multimedia transmission of file 310 to multimedia player 101 using the RTP protocol, and may send the multimedia information in RTP packets through the RTP communication. When the streaming server 100 has transmitted a first portion of the file 310, e.g., advertising portion 311, the streaming server 100 may receive, by the RTSP protocol, a message, e.g., a second PLAY message, with a new play range that may requests that the streaming server 100 send the multimedia, such that the multimedia player 101 continues playing the multimedia file 330 starting from a specific point, e.g., the point indicated by arrow 316 in FIG. 3.

By sending the request to continue playing starting from a specific point, multimedia player 101 may be indicating a request to skip advertising portion 312, at a specific point, e.g., the point at arrow 315, in order to begin viewing content portion 313. A known streaming server may make the skip, represented by line 319, and may begin to play content 313 without transmitting advertising 312. However, the streaming server 100 described in an embodiment of the invention may perform an operation, e.g., a "virtual RTSP skip" and may continue transmitting information 312 from the multimedia file. Streaming server 100 may send an RTSP response message of the type "RESPONSE, 200, OK" to multimedia player 101, instructing it to process its play order starting from point 316. Nevertheless, streaming server 100 continues transmitting RTP packets whose content corresponds to the portion 312 and not the portion 313. Streaming server 100 may accomplish this by creating a virtual file 330. Virtual file 330 may be created by streaming server 100 based on a combination of file 310 and requested skip 319. In virtual file 330, advertising 312 and content 313 may be displaced with respect to the normal order of file 310. This displacement may be indicated in FIG. 3 by broken lines 321, 322 and 323. Portions 312 and 313 of the file 310 may correspond to portions 332 and 333, respectively, of virtual file 330. The start position and finish position of file 310 may correspond to the start position and finish position of file 330, as shown in FIG. 3 by broken lines 324 and 326, respectively. Additionally, the portion of the advertising portion that already has been played, corresponding to portion 311 of original file 310, may correspond to portion 331 of virtual file 330, up to the point at which the second PLAY message is received, shown by arrow 315 and broken line 325.

The virtual file 330, for example, may be a file that is created and stored in a database or other storage means of the streaming server 100. However, this solution requires processing time in the streaming server 100 to create the virtual file 330. To avoid this problem of processing time, virtual file 330 may be an object, e.g., a component programmed in the C++ language, that may run in streaming server 100, and that may read the information from file 310 and transmit it to the RTSP and RTP modules of the streaming server 100 as though it were the file 330, thus obviating the need to create the file 330. Thus, file 330 may be created not as a stored file, but rather as virtual file that is accessed by means of the component that is run on streaming server 100.

Streaming server 100 may receive the second PLAY message, which may instruct streaming server 100 to play the range starting at the point indicated by arrow 316.

In response to this message, streaming server 100 may send a response signal, e.g., an RTSP RESPONSE message, to multimedia player 101, indicating that the range starting at the point indicated by arrow 316 may begin playing. After this signal is sent, and in response to the received second PLAY message, streaming server 100 may transmit the requested range. Nevertheless, streaming server 100 may apply the requested range to virtual file 330, instead of file 310. This may cause advertising 312 not to be skipped, even though a skip to the point indicated by arrow 316 was executed. Rather, the content located at the corresponding point in virtual file 330, e.g., corresponding advertising 332, may be sent. Further, because multimedia player 101 receives a message indicating a successful execution of the command to play the range starting at arrow 316, from the perspective of a viewer watching the content of multimedia player 101, streaming server 100 appears not to have received the second PLAY message, instructing streaming server 100 to skip the advertising. Nevertheless, from the perspective of multimedia player 101, streaming server 100 appears to have executed the command as requested. Further, streaming server 100 may transmit virtual file 330 using the same RTSP session that streaming server 100 used to transmit the multimedia file 310 prior to the virtual RTSP skip, thereby making the process transparent to multimedia player 101.

In this way, the streaming server 100 may change from sampling file 310 to sampling virtual file 330 without modifying the parameters of the streaming transmission. For example, streaming server 100 may maintain the values of the Pipelined-Request, Session and SSRC fields of the RTSP protocol, as well as the clocks used to calculate the timestamp value of the RTP packets and the "wall clock" used for the NTP timestamp fields of the SR-type control packets of the RTCP protocol.

In an embodiment of the invention, streaming server 100 uses the RTSP and RTP protocols to perform the virtual skip illustrated in FIG. 3 by taking advantage of some characteristics of the RTP and RTSP protocols, as described in more detail herein. Specifically, in order to perform a "virtual RTSP skip," streaming server 100 may coordinates operation of the RTSP and RTP modules of the streaming server 100 using headers of the RTSP messages called "Range" and "RTP-Info" that allow the multimedia player 101 to know what portion of the file the information pertains to for each RTP packet it receives.

A brief explanation is provided herein of the meaning of some fields that are found in the RTP packets and which are used in the present invention. The detailed information about the RTP protocol may be found in the RFC 3550 specifications referenced previously in this application. The "Payload" field at the end of the RTP packet may comprise the content of the stream, e.g., audio, video, sampled audio, sampled video, and the like. The "Sequence number" of the RTP data packets may be a 16-bit integer number that may be configured to increase by one unit each time an RTP packet of a stream is transmitted. It may be used, such that the receiver of the RTP packets may identify lost data packets and may order the RTP packets which arrive to the receiver in a different order than the order in which they were sent. The "Synchronization source (SSRC) identifier" field may be a 32-bit field used as a unique identifier. Each RTP stream sent by each data source sends, e.g., each stream sent by streaming server 100, has a unique SSRC identifier. If a server sends multiple streams in a multimedia transmission, such as audio and video, each stream may have its own SSRC identifier.

The "Timestamp" field may be a 32-bit integer number that may indicates the time when the sampling of the first byte of the content data of the RTP packet is performed, e.g., the time when the first byte of the Payload has been sampled. Each stream in the same RTSP session that is transmitted by RTP packets may use its own "RTP clock" to calculate the time at which the sampling of the first byte is performed. The RTP clock of each stream may be a clock that increases linearly and constantly. When the clock reaches its maximum value, e.g., $2^{32}-1$ for a 32-bit number, the clock may reset and start again at zero. For security reasons, the initial value of timestamp field may be randomly selected. The timestamp values of different streams of the same multimedia file that is transmitted using the RTP protocol may increase at different speeds and may take different initial values. In this way, for each stream that streaming server 100 transmits, streaming server 100 also may generate a timeline for that stream. For example, if a user is playing a content that has multiple streams, and the user delays the playing of that content for 20 seconds, e.g., the user sends a PAUSE command in the RTSP protocol, waits 20 seconds, and then sends a PLAY command, the RTP clocks of each stream that the RTP module of the streaming server 100 uses to calculate the timestamp may continue advancing regularly during those 20 seconds. When the user starts playing the content again, the value of the timestamp field of the new RTP packets that the streaming server 100 sends may have increased and may show the value of the clocks at the moment the sampling of the first byte of the content of each new RTP packet sent is performed.

Nevertheless, the order in which the data are sampled may not be the same order in which the data are sent, nor is this necessary for a successful data transmission. For example, MPEG video may transmit the video frames in a different order from the sampling order. For this reason the receiver may use the timestamp field and not the "Sequence number" field to determine the order in which the content should be played. In the audio samples a clock may be used which may have the same increment speed as the sampling frequency, e.g., the clock associated with an RTP audio session may be increased by one unit each time the audio is sampled. For example, with an audio sampling frequency of 16,000 samples per second (16 kHz), if each RTP packet contains 20 milliseconds (ms) of audio, each consecutive RTP packet may increment the timestamp field by 320 units, e.g., 0.02 seconds×16,000 samples/second, if there are no pauses between consecutive packets. The video samples may use a predetermined frequency, e.g., 90 kHz, or 60 kHz.

Multimedia player 101 may use the timestamp field of the RTP packets to calculate the moment of playing for each portion of the content sent in each RTP packet. The timestamp value of the RTP packets also may allow the multimedia player 101 to synchronize different streams of the same session. For example, an audio stream may be synchronized with a video stream, such that if the 20-minute and 10.4-second video moment is being played, the 20-minute 10.4-second audio moment also may be played.

The present invention may utilize the continuity of the timestamp field of the RTP packets. Specifically, streaming servers 100 may not rely on the timestamp data stored in the files that contain the multimedia content, but rather that the timestamp field of the RTP packets may be generated in the streaming server 100 in real time, which may taking into account the RTSP commands that the user sends to the streaming server 100. The timestamp field of the RTP packets may not correspond to an index that indicates a portion of the multimedia file, but rather may correspond to a clock that operates in the streaming server 100, and may be configured to increase linearly and constantly, and may not stop even though the user sends an RTSP PAUSE message. Streaming server 100 thus may use the RTSP and RTP protocols to transmit the virtual file 330 instead of the normal file 310 when there is an advertising skip.

The streaming server 100 may coordinate the RTSP module and the RTP module in order to perform the "virtual RTSP skip," thereby "tricking" the multimedia player 101 by sending the virtual file 330 instead of performing the requested skip 319 and sending the content 313 of the file 310. To do this, streaming server 100 may modify the normal relationship between the Normal Play Time ("NPT") parameter of the RTSP messages and the timestamp field of the RTP packets.

The multimedia player 101 may not be capable of calculating, for the content of each RTP packet, to which portion of the total content that the content of the RTP packet belongs, solely by using the timestamp field of the RTP packets. To make this calculation, the multimedia player 101 may need an initial reference that relates a specific moment in the playing of the multimedia file to the values that each of the clocks, used to generate the RTP timestamp values of each of the streams that form the multimedia file, has at that specific moment. For example, the multimedia player 101 may need to know that the 3.25-second moment of the playing of a multimedia file corresponds to an RTP timestamp value=12345678 of the audio stream, and an RTP timestamp value=29567112 of the video stream.

With this initial reference information, the multimedia player 101 may calculate the playing moment that each received RTP packet of audio and video corresponds to, as a function of the RTP timestamp value of each packet and the initial reference. Moreover, this initial reference information may allow the multimedia player 101 to synchronize the audio and video.

Streaming servers that use the RTSP and RTP protocols may send this information that relates one moment in the playing of a multimedia file to the RTP timestamp values of each stream to the multimedia player by using a plurality of, e.g., two, headers of the RTSP messages, which may be called "Range" and "RTP-Info." These headers may be included in the RESPONSE messages that the streaming server 100 may send to the multimedia player 101 in response to the PLAY messages that the multimedia player 101 sends to the streaming server 100.

The Range header of an RTSP message may indicate the play time range, and an initial moment that may be used as initial reference may be included. The Range header may code its information in various ways, e.g., by using Normal Play Time, e.g., "NPT," which may indicate the absolute position of the stream relative to the start of the presentation. The NPT parameter may comprise a decimal fraction. The left part of the decimal fraction may be seconds or hours, minutes and seconds. The right part may be fractions of seconds. For example, "Range:npt=3.25-15" may be understood to mean that a portion of the content is being played that begins at 3.25 seconds and ends at 15 seconds of a multimedia file that may contain multiple streams. The NPT parameter is explained in detail in paragraph 3.6 of the RFC 2326, referenced previously. In many popular media players, e.g., the Media Player™ from Microsoft™, the NPT may be the clock that the multimedia player 101 displays for the user to associate with the content. In some systems, information in minutes and seconds may be shown in a lower right corner of multimedia player 101. For example, multimedia player 101 may display "39:50" which may inform the user that the content shown corresponds to 39 minutes 50 seconds from the beginning of a video. In other embodiments, the Range header may also use other parameters to code its information, such as the SMPTE parameter, explained in paragraph 3.5 of RFC 2326. For simplicity, only the NPT parameter will be referenced with respect to these embodiments.

The field of the RTP-Info header of an RTSP message may comprise information related to the RTP packets of each stream transmitted using four fields called "url", "ssrc", "seq" and "rtptime." The field called "rtptime" of the RPT-Info header may be the value of the timestamp field of the RTP packet whose content (payload) corresponds to the start of the range of the multimedia file indicated in the Range header. This information may be the initial reference that the multimedia player 101 may use to associate each RTP packet of each stream with a specific moment of the multimedia file. By using the combined information from the Range and RTP-Info headers included in the RTSP RESPONSE-type message that the streaming server 100 sends to the multimedia player 101 in response to the PLAY message, the multimedia player 101 may relate the NPT and timestamp values to each other and may associate each of the content of the file 310 to the content of each RTP packet.

When the streaming server 100 receives the second PLAY message requesting that the streaming server 100 transmit the content of the file 310 starting from point 316, the streaming server 100 may respond with a RESPONSE message that may have a value of the Range header that indicates an initial range at point 336 and that may have a value of the RTP-Info header that indicates the value of the timestamp field of the RTP packets that the server will send with the content, corresponding to the requested range.

Multimedia player 101 may receive the RESPONSE message with the Range and RTP-Info values. In this way the multimedia player 101 may associate the value of the NPT parameter of the Range header, at the moment indicated by the arrow 336, with the values of the rtptime parameter of each stream. When the multimedia player 101 calculates the corresponding portion of the file for each RTP packet it receives, the multimedia player 101 may use NPT value corresponding to the play moment of the file indicated with the arrow 316 as an initial reference.

Multimedia player 101 may indicate to the user that the RTP packets it is preparing to receive may correspond to the content portion 313, but streaming server 100 may send the RTP packets that contain the information corresponding to the virtual file 330, and not to the original file 310. In the virtual file 330, the portion of the file corresponding to a range that begins at the arrow 336 is the portion 332 that corresponds to advertising portion 312 of the file 310 that the multimedia player 101 is attempting to skip. In this way the streaming server 100 may "trick" the multimedia player 101 and prevents multimedia player 101 from skipping advertising 312, since streaming server 100 continues sending RTP packets that transmit the portion 332 of the virtual file that corresponds to advertising portion 312 of file 310.

Using this process, the streaming server 100 may perform the "virtual RTSP skip" and transmit the virtual file 330 instead of the original file 310 without the multimedia player 101 detecting the virtual skip.

In an embodiment of the invention, the relationship between the values of the Range and RTP-Info headers also may be used to allow the initial synchronization of the different streams, such that the multimedia player 101 may establish an initial relationship between the NPT parameter and the timestamps of the RTP packets of each stream. Nevertheless, synchronization between different streams, such as those between the audio stream and the video stream, may be lost in a transmission. Thus, standard streaming servers also may use the RTCP protocol to prevent and compensate for deviations in the synchronization that may occur in a long multimedia transmission that contains multiple streams. To prevent deviations in the synchronization of different streams, such as in audio and video streams, streaming server 100 regularly may send to the multimedia player messages, e.g., "SR" messages using the RTCP protocol. These SR messages may use a plurality of, e.g., three, fields to keep different streams of the same presentation synchronized. The fields may be called "SSRC," "Network Time Protocol ("NTP") timestamp" and "RTP timestamp," for example.

The SSRC field may identify one stream of a presentation. The RTP timestamp field may be the value of the RTP clock associated with each stream when the streaming server 100 initiates the sampling of the content portion that is sent in each RTP packet, as discussed previously. The "NTP timestamp" field may be a reference clock that may be common to the different streams that the streaming server 100 sends in the same presentation, which also may be referred to as a "wallclock." This clock may be common for the different streams of a presentation and may allow the multimedia player 101 to maintain the synchronization of the different streams in long transmissions.

By sending these three values in the SR messages, the streaming server 100 may indicate to the multimedia player 101 the correspondence between the value of the wallclock and the RTP timestamp values of the clock which may be used to calculate the RTP timestamp value of the RTP packets of each stream. The value of the RTP timestamp field of an SR message in the RTCP protocol of a specific stream may correspond to the value of the RTP clock associated with the stream at the time indicated in the NTP timestamp value. In this way, the streaming server 100 also may allow synchronization of different streams in a long transmission.

In an embodiment of the invention, streaming server 100 may calculate the values of the fields of the SR messages of the RTCP protocol and the RTP packets from the virtual file 330 instead of the normal file 310. In other words, the value of the RTP timestamp field of an RTP packet of a specific stream may correspond to the value of the RTP clock associated with the stream at the moment sampling begins of the portion of the virtual file 330, which may be sent in the RTP packet.

Nevertheless, in FIG. 3, the area 335 of the virtual file 330 may not correspond with any portion of the original file 310. Moreover, the virtual file 330 may be longer than the original file 310. This may lead to a termination of the multimedia transmission before the user finishes viewing the content. This additional content portion which may not be viewed is illustrated in FIG. 3 as content portion 334.

Figure 4:
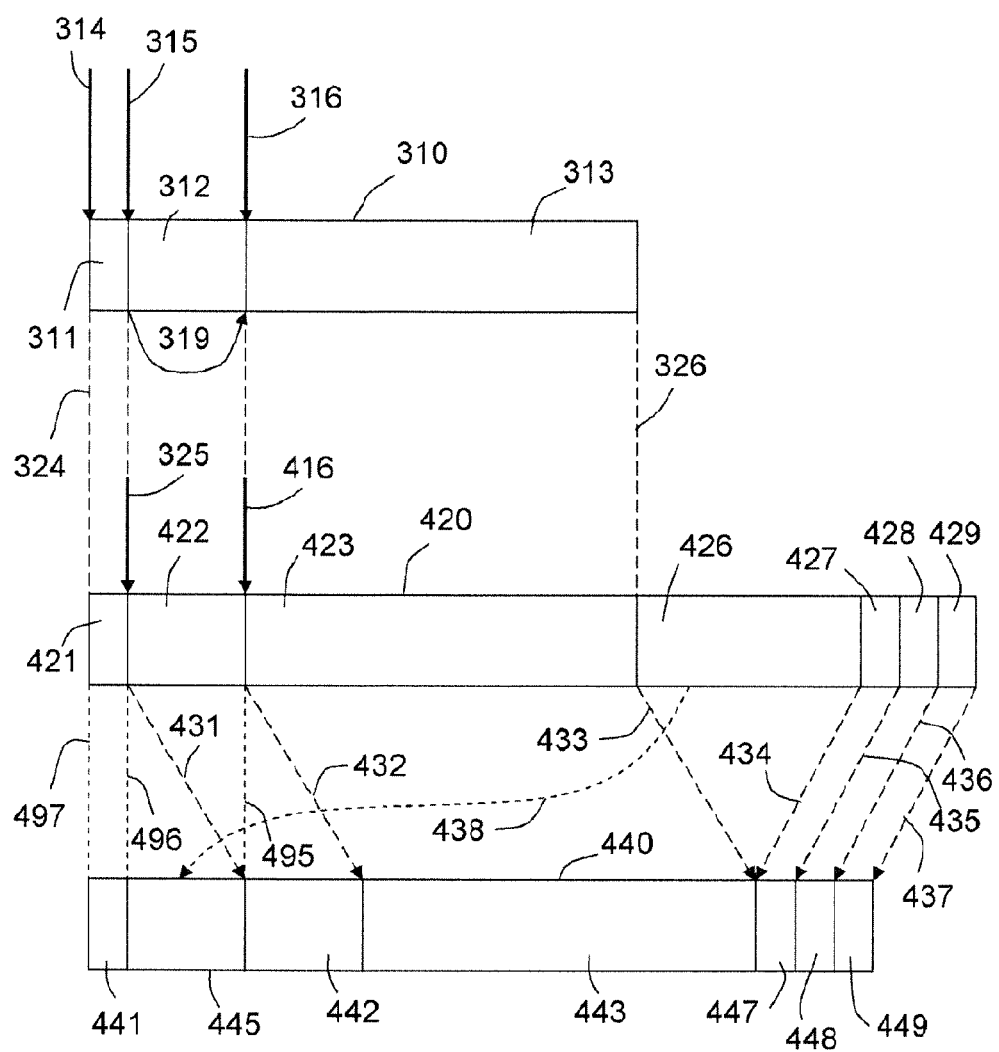
FIG. 4 is a diagram containing a multimedia file and two virtual files, and illustrating the process of transmitting the multimedia file when there is a request to retrieve non-sequential content from the file, according to an embodiment of the invention.

In another embodiment of the invention, as shown in FIG. 4, streaming server 100 may create a first virtual file 420 from the multimedia file 310 that may correspond to multimedia file 310 explained in FIG. 3. When streaming server 100 receives the SETUP and PLAY messages in order to play the content of a multimedia file 310, streaming server 100 may begin the transmission from the beginning a virtual file 420 that may comprise one or more areas of non-obligatory advertising 426 and multiple messages 427, 428 and 429.

The non-obligatory advertising portion 426, for example, may be related to the content portion, e.g., advertising about new movies. By increasing the length of the virtual file and including new content that may be played in the area of the "virtual skip" 335, the multimedia transmission may be prevented from terminating before the user finishes viewing the content, as shown in area 334 of FIG. 3. Advertising portions 421 and 422, and content portion 423 of virtual file 420 may correspond to advertising portions 311 and 312, and content portion 313 of digital file 310. Similarly to FIG. 3, advertising portion 442 of virtual file 440 may correspond to segment 422 of virtual file 420, as shown by arrows 431 and 432.

If a multimedia player sends a second PLAY message whose play range begins at 416, the streaming server 100 may create a new virtual file 440 and may perform a "virtual skip" as explained above with respect to FIG. 3. The virtual RTSP skip of the file 420 to the file 440 may be indicated by the broken lines 431, 432, 433, 434, 435, 436 and 437. Once the virtual file 440 has been created, the streaming server 100 may transmit portions of the new virtual file 440 using the same RTSP session used to send the file 420. By this "virtual skip," advertising portion 442, which may correspond to advertising portions 422 and 312 of virtual file 420 and digital file 310, respectively, may play prior to playing the content. Additionally, messages 427, 428, and 429 from virtual file 420 may correspond to messages 447, 448, and 449 in virtual file 440, as shown by broken lines 434, 435, 436, and 437.

In this way, by increasing the size of the virtual file 420 that may be transmitted at the time the second PLAY message is received, the transmission may not end without playing the area 334, as shown in FIG. 3. In the virtual file 440, area 445 may correspond to a portion of the non-obligatory advertising 426. This correspondence may be indicated in FIG. 4 with the broken line arrow 438. Thus, if the user sends a third PLAY message that may begin the play range in the area 445, the server may transmit the non-obligatory advertising 426.

In the virtual file 440, the advertising portion that already has been viewed, e.g., advertising portion 441 may correspond to advertising portion 421 in virtual file 420, and advertising portion 311 in file 310. The beginning of file 310 may correspond to the beginning of virtual files 420 and 440, as shown by broken lines 324 and 497, respectively. Further, the point 315 at which the second PLAY message is received in file 310 may correspond to similar locations in virtual files 420 and 440, as shown by broken lines 325 and 496, respectively.

Figure 5:
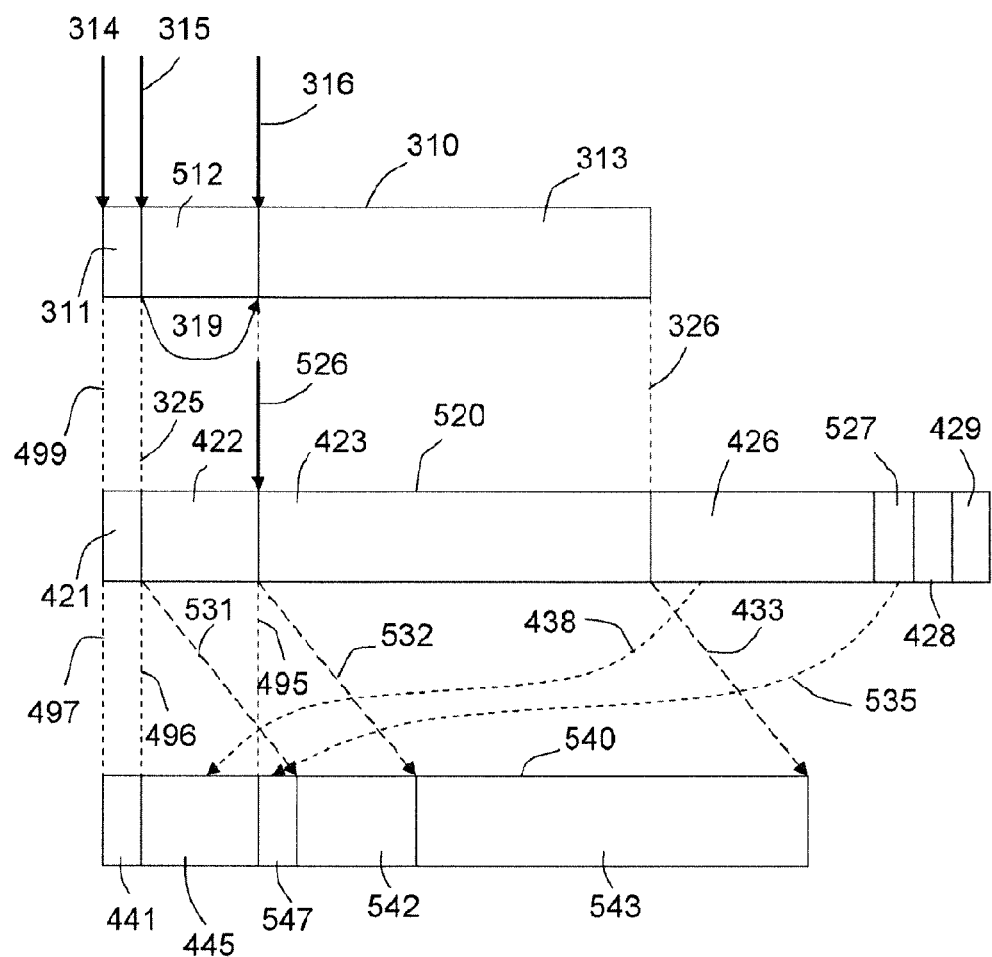
FIG. 5 is a diagram containing a multimedia file and two virtual files, and illustrating the process of transmitting the multimedia file when there is a request to retrieve non-sequential content from the file, according to another embodiment of the invention.

In an embodiment of the invention as shown in FIG. 5, when the user instructs multimedia player 101 to send the second PLAY message with start of play at 526, the streaming server 100 may create a new virtual file 540 that first may transmit a multimedia message 547 before continuing to transmit the obligatory advertising 542 and the content 543. In this embodiment, obligatory advertising 542 may be inserted into virtual file 540 after multimedia message 547 is inserted into virtual file 540, as shown by broken lines 531 and 532. Multimedia message 547 may correspond to multimedia message 527 of virtual file 520, as shown by broken line 535. The multimedia message 547 may make an indication to the user, e.g., that the user may be viewing content financed by advertising and that the advertising may not be skipped. In an embodiment of the invention, the streaming server 100 may end the multimedia transmission if the multimedia player 101 sends another PLAY message to skip the advertising.

Figure 6:
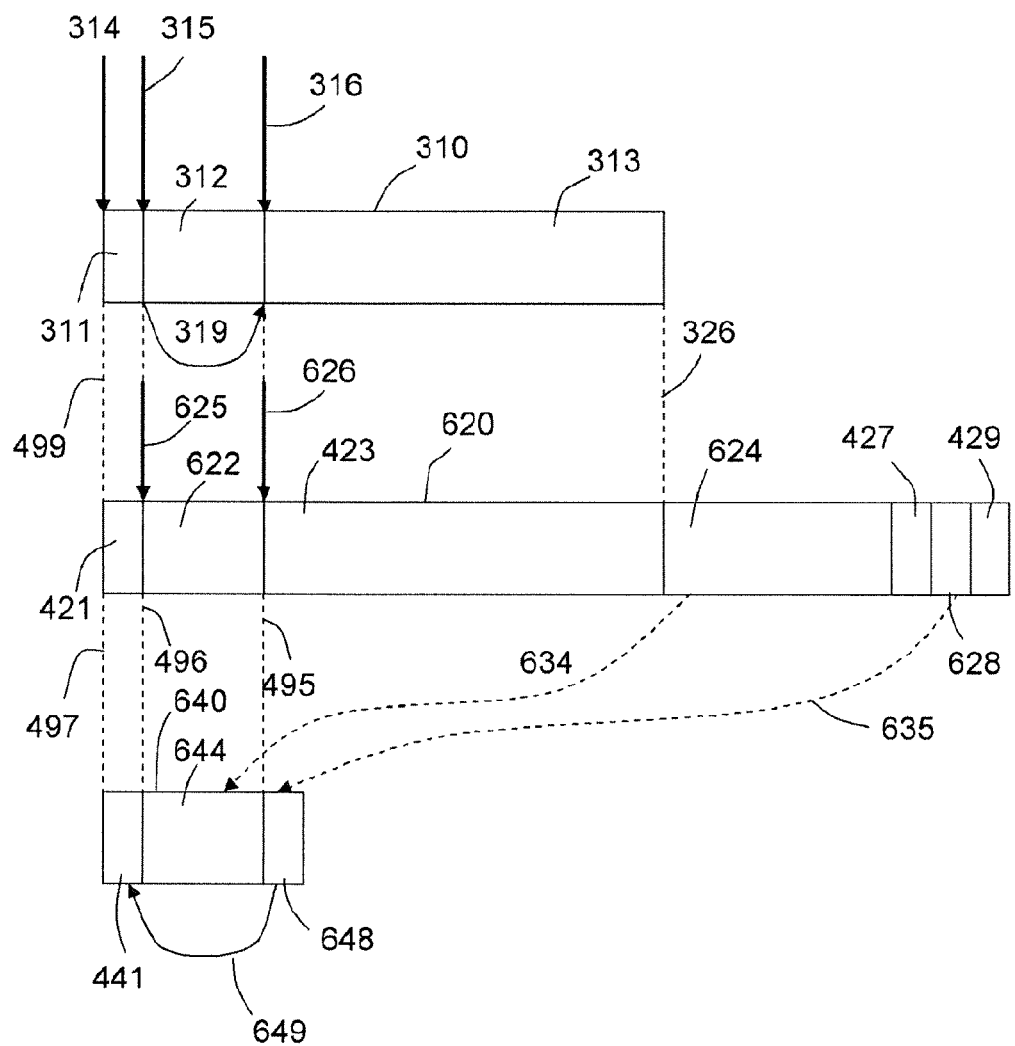
FIG. 6 is a diagram containing a multimedia file and two virtual files, and illustrating the process of transmitting the multimedia file when there is a request to retrieve non-sequential content from the file, according to still another embodiment of the invention.

In still another embodiment of the invention, shown in FIG. 6, a multimedia player 101 may receive a multimedia file 620, and may send a second PLAY message with initial range at the point indicated by the arrow 626, in order to skip the portion 622 with advertising. The streaming server 100 creates a new virtual file 640 that transmits a multimedia message 648, which may correspond to message 628 of virtual file 620, as shown by broken line 635. Virtual file 640 also may include non-obligatory advertising 644, which may correspond to non-obligatory advertising 624 of virtual file 620. Multimedia message 648 may have a duration of 10 seconds, for example, and may notify the user that he must go back to see the advertising again within 10 seconds.

If the multimedia player 101 sends a reverse PLAY message within 10 seconds, returning to a play point prior to the point 625 that the streaming server 100 was transmitting when the user performed the skip, then the streaming server 100 may return to using virtual file 620 and may continue the advertising transmission 622. In FIG. 6, the reverse PLAY message is indicated by line 649.

If the multimedia player 101 does not send a reverse PLAY message within the 10 seconds of the message 648, then the streaming server 100 continues transmitting the message 648 and ends the transmission of the multimedia file.

Figure 7:
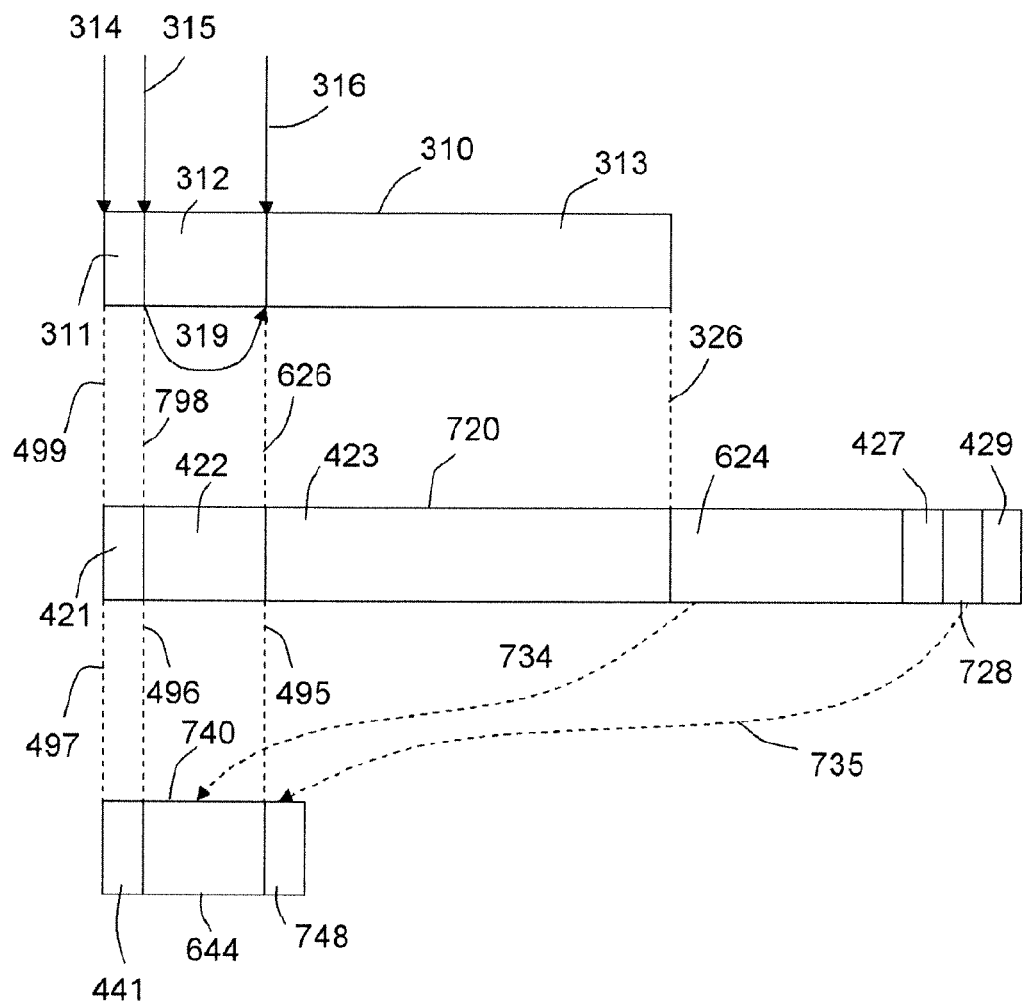
FIG. 7 is a diagram containing a multimedia file and two virtual files, and illustrating the process of transmitting the multimedia file when there is a request to retrieve non-sequential content from the file, according to yet another embodiment of the invention.

FIG. 7 shows another virtual file which, similarly to the embodiment shown in FIG. 6, may create virtual file 740, and may transmit a message 748, which may correspond to message 728 of virtual file 720, as shown by broken line 735, to the multimedia player 101. Unlike the embodiment shown in FIG. 6, however, in FIG. 7, the streaming server 100 may not wait for a reverse PLAY message. In this embodiment, streaming server 100 simply may transmit message 748 and may end the transmission. The message 748, for example, may notify the user that he has performed an unauthorized skip of the advertising and it is going to terminate the transmission.

In an embodiment of the invention, fast-forwarding through portions of content also may be prevented. In the RTSP protocol, the fast forward may operate, such that when the streaming server 100 is transmitting at twice the normal speed, the streaming server 100 may only send RTP packets only one out of every two video images to the multimedia player 101. If the speed is four times normal speed, the streaming server 100 only may send one out of every four images, and so on. The RTSP protocol may use a header called "Scale" that is explained in paragraph 12.34 of the RFC 2326, the related portions of which are described herein.

A value of 1 in the Scale header may instruct the streaming server 100 to transmit the content to the multimedia player 101 at normal play speed. If the Scale value is not 1, then the value may indicate the ratio at which content may be transmitted with respect to the normal play speed, e.g., a ratio of 2 instructs the streaming server 100 to transmit at twice the normal speed. Similarly, a ratio of 0.5 may instruct streaming server 100 to transmit the content at half the normal speed. A negative ratio may instruct streaming server 100 to play the content in reverse, e.g., in the direction that goes from the end of the content toward the beginning of the content.

A multimedia player 101 that is playing a multimedia file, e.g., a file containing content 420 in FIG. 4, may send a PLAY message to the streaming server 100 with a Scale value of 2, such that the advertising plays quickly. In an embodiment of the invention, the streaming server 100 may consider the fast forward as equivalent to skipping the advertising, and proceeding as explained in FIGS. 3 to 7.

Using the embodiment described with respect to FIG. 4 as an example, if the multimedia player 101 is playing the content of a file 420 and at point 325 the player sends a message to the server to increase the speed of play, the streaming server 100 may transmits the content at the requested speed. When the transmitted content reaches point 416 the multimedia player 101 again may send another PLAY message with a start range at 416 and normal play speed in order to view the content at normal speed. Upon receiving this second PLAY message, the streaming server 100 may detect that all of the advertising 422 has not been transmitted, and thereby may treats the fast forward command as a PLAY message, in the manner described previously. Other combinations that use messages like the ones explained in FIGS. 5, 6 and 7 are also applicable and make it possible to manage fast forward as a way of skipping different forms using different virtual files that may comprise messages for a user who is using a multimedia player.

In still another embodiment of the invention, streaming server 100 may choose among different types of virtual files, depending on the type of multimedia player 101 used in the equipment 102. In order to detect the type of multimedia player, the streaming server 100 may use the header called "User-Agent" that indicates in the RTSP messages the multimedia player that is sending them. The RFC 2326 specifications, in paragraph 12.41, refer to paragraph 14.42 of the specifications for the HTTP protocol to explain the "User-Agent" field.

Although the RTSP protocol is a common specification, each multimedia player 101 may implement it in a particular manner. Moreover, there are parts of the RTSP protocol that the RFC 2326 considers optional. In an embodiment of the invention, streaming server 100 selects the mode of operation, e.g., one of the modes described with respect to FIGS. 4-7 based on the type of multimedia player 101. By adapting the mode of operation of the streaming server 100 to each type of multimedia player 101, the streaming server 100 also may detect if multimedia player 101 is an unauthorized type used to avoid viewing advertising or for unauthorized uses of the content and avoid it. Thus, the streaming server 100 may store this information about unauthorized players in its database 108.

An example of unauthorized multimedia player is an application installed in the same equipment 102 as the multimedia player 101 and that may not play the multimedia file while it is downloading, but rather may be limited to storing the content of the multimedia file in the equipment 102 in order to be able to play it later, directly from the equipment 102 without needing to connect to the streaming server 100, by taking advantage of the multimedia player cache.

When the streaming server 100 detects an unauthorized player, streaming server 100 may send a RESPONSE error message to the multimedia player or not process the PLAY message and not send the corresponding RESPONSE message, or streaming server 100 may send a RESPONSE message as though it had processed the PLAY message, but nevertheless may ignore it. It may also occur that a user uses an authorized multimedia player 101 in a way that avoids viewing the advertising. For example, a user may use an Internet browser that may comprise a plug-in that is a multimedia player 101 in common use, but instead of playing a multimedia file, the user may use the browser's "Save As" option to keep the multimedia file without playing it while it is downloading. In this case, streaming server 100 may detect this unauthorized use, for example analyzing the RTCP control messages that the multimedia player 101 sends to the streaming server 100 and may terminate the transmission if it detects that the multimedia player 101 is not playing the multimedia file while it is being downloaded.

The streaming server 100 may prevent the multimedia player 101 from being able to play the content of a file more than once without seeing the advertising again. Thus, the streaming server 100 may generate a new virtual file, e.g. the virtual file 420 shown in FIG. 4, under specific circumstances that are explained herein. The streaming server 100 may account for time elapsed since a transmission of the content portion that a user instructs a multimedia player 101 to request to play again. For example, a user may use a multimedia player 101 to view all of the advertising before viewing a movie that is transmitted from the streaming server 100, and may wish to see specific scenes again within a few minutes or hours, which may be allowed, but after a few days or weeks, may be disallowed by streaming server 100 unless the user views the advertising portion again.

In order to manage this operation, streaming server 100 may use the "Cache-Control" and "Expires" headers in the RTSP messages that streaming server 100 sends to the multimedia player 101, e.g., in the RESPONSE message that streaming server 100 sends in response to a SETUP message from the multimedia player 101.

The Cache-Control header and its operation are explained in paragraphs 12.8 and 13 of the RFC 2326. The Expires header is explained in paragraph 12.19 of the RFC 2326, The Cache-Control header may regulate the operation of the different cache devices located between the streaming server 100 and the multimedia player 101, including the cache of multimedia player 101. The Expires header may report when a multimedia content or a description file of a multimedia content expires. A cache device may be configured to disallow the transmission of expired content, and to contact the streaming server 100 in order to receive updated content. By using the headers, streaming server 100 may operate to create a new virtual file with advertising, or allow the advertising to be skipped, depending on the time elapsed since it transmitted a multimedia file.

For example, the streaming server 100 may use the "must-revalidate" value in the Cache-Control header of the RESPONSE message that streaming server 100 sends to the multimedia player 101 in response to a SETUP message. This value of the Cache-Control header may indicate to the cache devices that the cache devices should not transmit an expired content without first validating it with the streaming server 100. The content may expire at the time indicated in the Expires header. This method is not provided for in the RTSP protocol, since it marks content which has not actually expired, as expired content. The marking of unexpired content as expired may be carried out in order to allow the creation of a new virtual file in the streaming server 100, and to allow insertion of new advertising when a certain amount of time has elapsed, e.g., 24 hours. Other embodiments of the invention may use the Cache-Control and Expires headers in other ways in order to accomplish the same objective. For example, streaming server 100 may give the "no-cache" value to the Cache-Control header, indicating that the multimedia transmission may not be stored in any cache. Streaming server 100 also may use a cache control or other system, depending on the type of multimedia player used.

Figure 8:
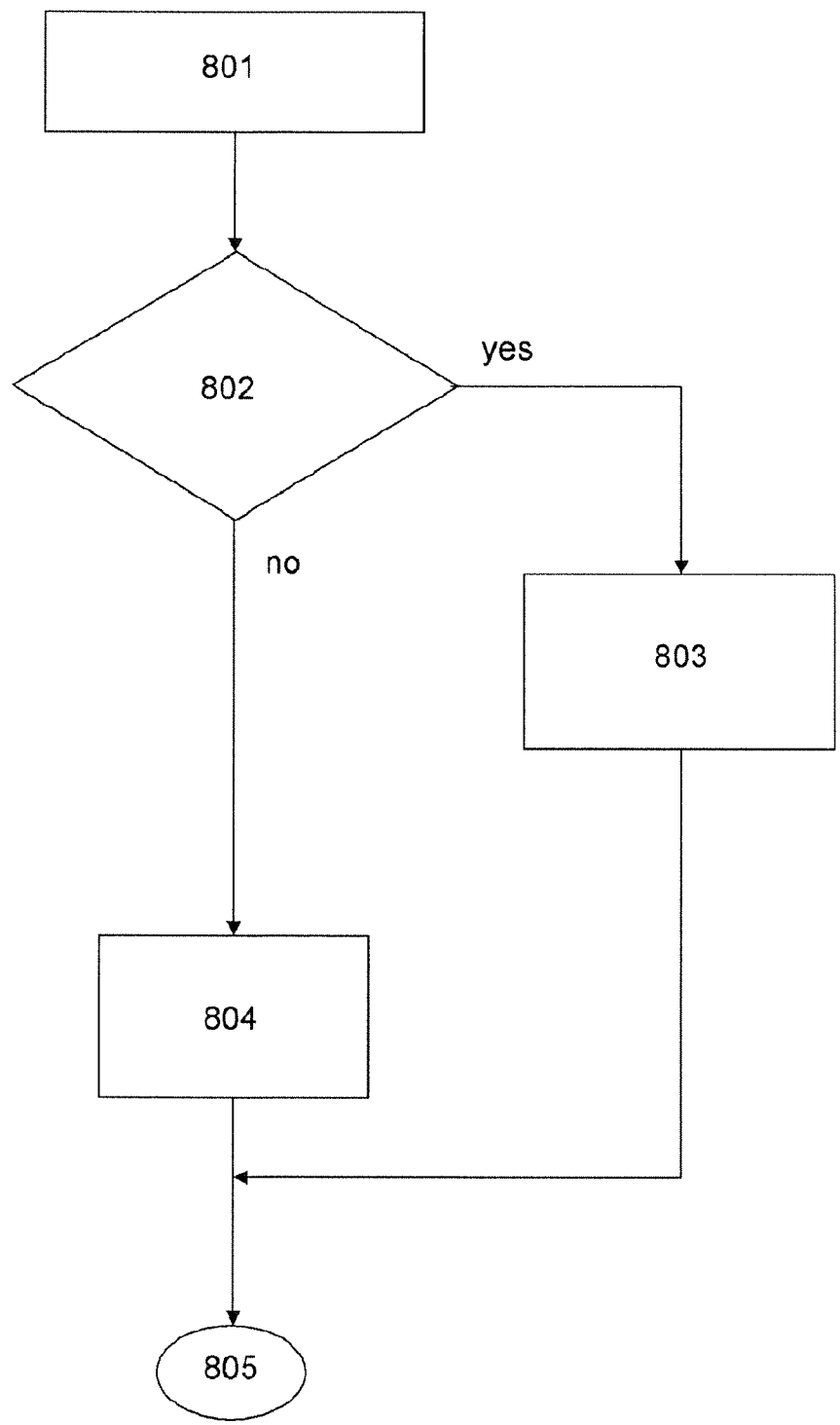
FIG. 8 is a flowchart illustrating a verification carried out according to an embodiment of the invention.

FIG. 8 illustrates the verification process used by the streaming server 100 to verify whether the advertising has been transmitted, according to an embodiment of the invention. The streaming server 100 may receive a PLAY-type RTSP message at step 801, which may comprise a Range header. The Range header may comprise an initial range and final range, and the initial range may not correspond with the beginning of the multimedia file. At step 802 the streaming server 100 may perform the verification of whether RTP packets with all of the advertising have been transmitted from the multimedia file that may be located prior to the initial range.

If the streaming server 100 has transmitted all of the advertising from the multimedia file prior to the initial range, then at step 803 the streaming server 100 may process the PLAY message normally and may transmit the range of multimedia content indicated in the PLAY message. In this way, a user may move about freely in the portions of the file whose advertising the user has already viewed. For example, if all of the advertising is at the beginning of the file, this may allow the user to instruct the multimedia player 101 to go forward or backward freely in the multimedia file in order to choose the content that the user wants to see. Nevertheless, if in the verification at step 802, the streaming server 100 detects that all of the advertising has not been transmitted from the multimedia file before the initial range, the streaming server 100 may go to step 804, in which a PLAY message which contains instructions to skip an advertisement may be processed by the streaming server 100. This may cause streaming server 100 to execute one of the operations to continue playing the advertising, e.g., the operations described with respect to FIGS. 4-7. At step 805, the process may terminate.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are considered as exemplary of the claimed invention, the scope of which is indicated by the following claims.

What is claimed is:

1. An apparatus comprising:
a server computing device having a processor coupled to a storage database, the server computing device configured to:
communicate with a multimedia player of a user device;
transmit at least a portion of a first digital file comprising advertising content and requested content;
receive a play request subsequent to transmission of a first advertisement portion that attempts to skip a second advertisement portion of the first digital file; and
in response to receipt of the play request, transmit a virtual digital file as the first digital file, wherein the virtual digital file includes supplemental digital data between the first advertisement portion and the second advertisement portion;
wherein the advertising content and the requested content are delivered in data packets having a sequence number and timestamp field and, in response to receiving the play request that attempts to skip the second advertisement portion, the server computing device modifies the timestamp field of the second advertisement portion to create the virtual digital file.

2. The apparatus of claim 1 wherein the server computing device is further configured to complete transmission of the second advertisement portion prior to transmission of the requested content.

3. The apparatus of claim 1 wherein the server computing device is configured to modify the first digital file to generate the virtual digital file by displacing the second advertising portion and the requested content in response to the play request.

4. The apparatus of claim 3 wherein the server computing device is configured to modify the first digital file to generate the virtual digital file by placing the second advertising portion at a time corresponding to the play request.

5. The apparatus of claim 1 wherein the server computing device is configured to switch from transmitting the first digital file to the virtual digital file while maintaining streaming session parameters.

6. A non-transitory computer readable medium having instructions stored thereon that in response to execution of the instructions cause one or more computing devices to perform operations comprising:
- receiving a request for a requested content from a multimedia player;
- transmitting a portion of a first digital file comprising advertising and the requested content;
- after transmitting a first portion of the advertising, receiving a second request to skip over a second portion of the advertising and to play the requested content;
- in response to the second request to skip over the second portion of the advertising, transmitting a second digital file as the first digital file, wherein the second digital file includes supplemental digital data between the first portion of the advertising and the second portion of the advertising;
- wherein the first digital file is delivered in data packets having a sequence number and a timestamp field and further comprising, in response to receiving the second request that attempts to skip the second portion of the advertising, modifying the timestamp filed of the second portion of the advertising to create a virtual skip.

7. The non-transitory computer readable medium of claim 6 further comprising instructions causing the one or more computing devices to perform a virtual skip.

8. The non-transitory computer readable medium of claim 7 wherein the virtual skip places the second portion of the advertising at a point corresponding to the second request.

9. An apparatus comprising:
- a server computing device having a processor coupled to a storage database, the server computing device configured to:
- communicate with a multimedia player of a user device;
- transmit at least a portion of a first digital file comprising advertising content and requested content;
- receive a play request subsequent to transmission of a first advertisement portion that attempts to skip a second advertisement portion of the first digital file; and
- in response to receipt of the play request, transmit a virtual digital file as the first digital file, wherein the virtual digital file includes supplemental digital data between the first advertisement portion and the second advertisement portion; and
- wherein the server computing device is further configured to modify the first digital file to generate the virtual digital file by displacing the second advertising portion and the requested content in response to the play request and by placing the second advertising portion at a time corresponding to the play request.

10. The apparatus of claim 9 wherein the server computing device is further configured to complete transmission of the second advertisement portion prior to transmission of the requested content.

11. The apparatus of claim 9 wherein the server computing device is configured to switch from transmitting the first digital file to the virtual digital file while maintaining streaming session parameters.

12. A non-transitory computer readable medium having instructions stored thereon that in response to execution of the instructions cause one or more computing devices to perform operations comprising:
- receiving a request for a requested content from a multimedia player;
- transmitting a portion of a first digital file comprising advertising and the requested content;
- after transmitting a first portion of the advertising, receiving a second request to skip over a second portion of the advertising and to play the requested content;
- in response to the second request to skip over the second portion of the advertising, transmitting a second digital file as the first digital file, wherein the second digital file includes supplemental digital data between the first portion of the advertising and the second portion of the advertising; and
- causing the one or more computing devices to perform a virtual skip, wherein the virtual skip places the second portion of the advertising at a point corresponding to the second request.

13. The non-transitory computer readable medium of claim 12 wherein the first digital file is delivered in data packets having a sequence number and a timestamp field and further comprising, in response to receiving the second request that attempts to skip the second advertisement portion, modifying the timestamp field of the second advertisement portion.

* * * * *